(No Model.)

J. J. BLACK.
FIFTH WHEEL.

No. 451,687. Patented May 5, 1891.

WITNESSES.
Frank Miller.
Albert H. Bates

INVENTOR.
John J. Black
By his attorneys
Watson + Thurston

THE NORRIS PETERS CO., PHOTO-LITHO., WASHINGTON, D. C.

UNITED STATES PATENT OFFICE.

JOHN J. BLACK, OF CLEVELAND, OHIO, ASSIGNOR TO THE BLACK SPRING AND GEAR COMPANY, OF SAME PLACE.

FIFTH-WHEEL.

SPECIFICATION forming part of Letters Patent No. 451,687, dated May 5, 1891.

Application filed May 19, 1890. Serial No. 352,346. (No model.)

*To all whom it may concern:*

Be it known that I, JOHN J. BLACK, a citizen of the United States, residing at Cleveland, in the county of Cuyahoga and State of Ohio, have invented certain new and useful Improvements in Fifth-Wheels, of which the following is such a full, clear, and exact description as will enable others skilled in the art to which it appertains to make and use the same.

My invention is in the nature of an improvement upon that form of fifth-wheel which is first shown in my patent, No. 392,712, granted to me November 13, 1888.

The objects of my invention are to reduce the cost of such mechanism, to increase its strength and durability without increasing its weight, and to provide means whereby it will operate more easily—that is, with less friction—than does the prior device shown in the patent mentioned or any modification thereof.

To this end my invention consists of the construction and combination of parts herein described, and pointed out definitely in the claims.

Figure 1:
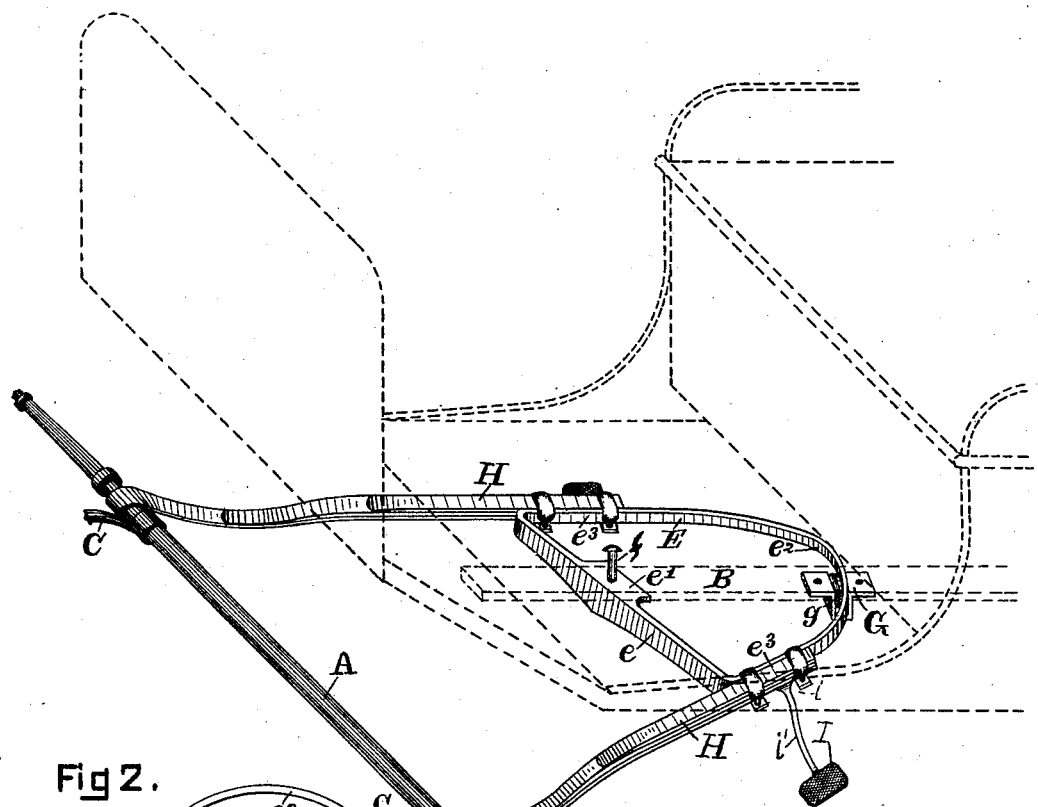
Figure 2:
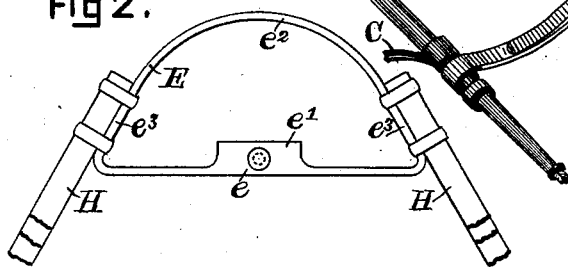
Figure 3:
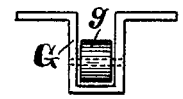

Referring to the drawings, Figure 1 is a perspective view of my improved fifth-wheel, with the wagon-body shown in dotted lines. Fig. 2 is a top view of the D-iron which forms a part thereof, and Fig. 3 is a detail view of the bracket and roller.

Referring to the parts by letter, A represents the front axle, and B the body of the vehicle, and C C represents the shafts.

E represents a frame which I call the "D-iron," which consists of a cross-bar $e$, having a suitable rub-plate $e'$, through which the king-bolt passes, the part $e^2$, curved in the form of an arc of a circle of which the king-bolt is the center, and, in the best form, the two straight parts $e^3 e^3$, which connect this curved part with the cross-bar and which lie at an angle to each other, as shown most clearly in Fig. 2, whereby the straight side bars H are spread apart at their outer ends, and are thus enabled to connect with the axle near the wheels and give a more stable support to the wagon-body. In its preferable form this D-iron is forged from a single piece of wrought metal, which is thicker from top to bottom than in the opposite direction, whereby it may be made lighter than when in any other form and at the same time be strong enough for its intended purpose.

G represents a bracket, secured to the under side of the wagon-body behind the king-bolt, and in this bracket is mounted a roller $g$. The curved part of the D-iron, when the parts are properly arranged, lies between this roller and the bottom of the wagon.

H H represents bars or springs by which the D-iron is connected with the forward axle. The inner ends of these bars or springs are rigidly secured to the sides of the straight part of the D-iron by clips, as shown in the drawings, or by other suitable means. Either the shafts or the outer ends of the bars or springs H should be connected to the forward axle pivotally, and in the preferable construction it is the bars or springs H that are so connected therewith.

When the parts are arranged as shown, the bars or springs H and the D-iron, when secured together as explained, become in effect a lever pivoted at the axle.

The weight is applied by the wagon-body at the king-bolt, and the tendency is to throw the rear end of the lever—*i. e.*, the curved part of the D-iron—downward. This movement is arrested, throws the curved part $e^2$ against the roller $g$, and when the fifth-wheel is turning upon the king-bolt for the purpose of turning the wagon the roller revolves, thereby reducing the friction to a minimum.

It is believed that the construction above described is superior to any of the forms involving this same general principle which have been shown in my prior patents, and that it is superior to them, particularly in that it is cheaper, stronger for its weight, and operates with less friction than any of said former devices.

I represents a step, $i$ a plate substantially parallel to said step, and $i'$ a bar rigidly connecting said plate and step. This plate $i$ is rigidly fastened to the D-iron by the same clips which fasten the side bars H thereto. This is the most inexpensive mode of connecting a step to a wagon, and a step so connected with the D-iron will always be in a convenient position for use on one side of the wagon, while on the other side, when the front wheels are turned about the king-bolt, said step will be carried beneath the wagon-body, where it can offer no obstruction to the operation of the running-gear or fifth-wheel mechanism.

Having thus described my invention, what I claim as new, and desire to secure by Letters Patent, is—

1. The combination of the wagon-body, the D-iron consisting of the curved part $e^2$, the cross-bar $e$, and plate $e'$ with the king-bolt $f$, the bracket G, having the roller $g$, and suitable connection between said D-iron and the forward axle, substantially as and for the purpose specified.

2. In a fifth-wheel for vehicles, a D-iron consisting of a cross-bar $e$, a rub-plate $e'$, the curved part $e^2$, and the straight side pieces $e^3$ $e^3$, which side pieces are set at an angle to each other, said parts being integral with each other and thicker from top to bottom than in the opposite direction, substantially as and for the purpose specified.

3. The combination of a wagon-body and a D-iron consisting of the curved part $e^2$, the cross-bar $e$, and plate $e'$ with the king-bolt $f$, bracket G, side bars H, the plate $i$, step I, connecting-bar $i'$, and clips which rigidly connect the side bar, D-iron, and plate $i$, substantially as and for the purpose specified.

4. The combination of a wagon-body, an axle, a frame having a curved bearing-plate, a king-bolt engaging with said frame at substantially the center of curvature of said plate, a bracket secured to said body, a roller pivoted to said bracket, and springs connected at their rear ends to said frame and at their forward ends to the axle, substantially as and for the purpose specified.

JOHN J. BLACK.

Witnesses:
THOS. C. WILLARD,
ALBERT H. BATES.